United States Patent [19]

Liu

[11] 4,263,415

[45] Apr. 21, 1981

[54] POLYCARBONATE COMPOSITIONS

[75] Inventor: Ping Y. Liu, Naperville, Ill.

[73] Assignee: General Electric Company, Pittsfield, Mass.

[21] Appl. No.: 69,822

[22] Filed: Aug. 27, 1979

[51] Int. Cl.³ .............................................. C08L 69/00
[52] U.S. Cl. .................................... 525/148; 525/146
[58] Field of Search ................................ 525/148, 146

[56] References Cited

U.S. PATENT DOCUMENTS 3,873,641   3/1975   Margotte et al. ..................... 525/146

FOREIGN PATENT DOCUMENTS 2303190   8/1973   Fed. Rep. of Germany ........... 525/148
1182807   3/1970   United Kingdom ..................... 525/148

Primary Examiner—Joseph L. Schofer
Assistant Examiner—Peter F. Kulkosky

[57] ABSTRACT

The present invention is concerned with ternary polycarbonate compositions having improved impact strength. The ternary compositions comprise a mixture of thermoplastic, aromatic polycarbonates which are derived from aromatic dihydroxy compounds, an acrylate copolymer, and a butadiene-styrene copolymer.

8 Claims, No Drawings

POLYCARBONATE COMPOSITIONS

The present invention relates to improving both the aged impact strength and the low temperature impact strength of high molecular weight, aromatic polycarbonate resins.

BACKGROUND OF THE INVENTION

It is well known that polycarbonate resins have high impact strength below a critical thickness of between about ⅛ and ¼ inches. Above this average thickness the impact strength of polycarbonate resins is low. Additionally, the impact strength of polycarbonate resins decreases rapidly as temperatures decrease below about −5° C. and also after aging the polymers at elevated temperatures above about 100° C. These characteristics consequently limit the fields of applications of these resins. Thus, unmodified polycarbonate materials are not practical for use at low or high temperatures when good impact strength is required. Therefore, it is desirable to improve both the impact strength of polycarbonate resins at low and high temperatures and their aged impact strength to thereby expand the fields of application of such resins.

DESCRIPTION OF THE INVENTION

It has now been discovered that ternary compositions, which comprise a high molecular weight, thermoplastic, aromatic polycarbonate, an acrylate copolymer and a butadiene-styrene copolymer, exhibit not only improved aged impact strenth, but certain formulations thereof also exhibit improved impact strength at both low and high temperatures when compared to unmodified polycarbonate resins. These novel compositions also exhibit good weld-line strength.

High molecular weight, thermoplastic, aromatic polycarbonates in the sense of the present invention are to be understood as homopolycarbonates and copolycarbonates and mixtures thereof which have average molecular weights of about 8,000 to more than 200,000, preferably of about 20,000 to 80,000 and an I.V. of 0.40 to 0.1 dl/g as measured in methylene chloride at 25° C. These polycarbonates are derived from dihydric phenols such as, for example, 2,2-bis(4-hydroxyphenyl)propane, bis(4-hydroxyphenyl) methane, 2,2-bis(4-hydroxy-3-methylphenyl)propane, 4,4-bis(4-hydroxyphenyl)heptane, 2,2-(3,5,3′,5′-tetrachloro-4,4′-dihydroxyphenyl)propane, 2,2-(3,5,3′,5′-tetrabromo-4,4′-dihydroxydiphenyl) propane, and (3,3′-dichloro-4,4′-dihydroxydiphenyl)methane. Other dihydric phenols which are also suitable for use in the preparation of the above polycarbonates are disclosed in U.S. Pat. Nos. 2,999,835, 3,028,365, 3,334,154, and 4,131,575.

These aromatic polycarbonates can be manufactured by known processes, such as, for example, by reacting a dihydric phenol with a carbonate precursor such as phosgene in accordance with methods set forth in the above-cited literature and U.S. Pat. Nos. 4,018,750 and 4,123,436, or by transesterification processes such as are disclosed in U.S. Pat. No. 3,153,008, as well as other processes known to those skilled in the art.

The aromatic polycarbonates utilized in the present invention also include the polymeric derivates of a dihydric phenol, a dicarboxylic acid, and carbonic acid, such as are disclosed in U.S. Pat. No. 3,169,131.

It is also possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic polycarbonate utilized in the practice of this invention. Also employed in the practice of this invention can be blends of any of the above materials to provide the aromatic polycarbonate.

Branched polycarbonates, such as are described in U.S. Pat. No. 4,001,184, can also be utilized in the practice of this invention, as can blends of a linear polycarbonate and a branched polycarbonate.

The "acrylate" copolymer utilized in the present invention is a copolymer of a $C_1$–$C_5$ methacrylate and a $C_1$–$C_5$ acrylate, wherein the term "$C_1$–$C_5$" represents both saturated and unsaturated, straight or branched chained aliphatic hydrocarbon radicals having from 1 to 5 carbon atoms.

Preferred acrylates for use in the copolymer are methyl acrylate, ethyl acrylate, isobutyl acrylate, 1,4-butanediol diacrylate, n-butyl acrylate, and 1,3-butylene diacrylate. Preferred methacrylates for use in this copolymer include methyl methacrylate, isobutyl methacrylate, 1,3-butylene dimethacrylate, butyl methacrylate and ethyl methacrylate.

The acrylate portion of the copolymer, based on the total weight of the copolymer, can range from about 50 to about 85 weight percent. The methacrylate portion of the copolymer can range from about 15 to about 50 weight percent.

The preferred acrylate copolymer for use in this invention is a copolymer of n-butyl acrylate and methyl methacrylate in which the weight ratio of the n-butyl acrylate fraction to the methyl methacrylate fraction in the copolymer is about 3 to 2.

Suitable acrylate copolymers, as defined above, can be prepared by methods well known to those skilled in the art or can be obtained commercially. For example, Rohm and Haas' Acryloid ® KM 330 copolymer, which is a copolymer of n-butyl acrylate and methyl methacrylate, is suitable for use in the present invention.

In the butadiene-styrene copolymer utilized herein, the butadiene portion of the copolymer, based on the total weight of the copolymer, can range from about 15 to about 40 weight percent. The styrene portion of the copolymer can range from about 60 to about 85 weight percent.

In the preferred butadiene-styrene copolymer for use herein, the weight ratio of the styrene fraction to the butadiene fraction ranges from about 2 to 1 to about 3 to 1.

Suitable butadiene-styrene copolymers, as defined above, can be prepared by methods well known to those skilled in the art or can be obtained commercially. For example, Phillips Petroleum K-Resin ® KR 03 BDS polymer is suitable for use in the present invention.

The amount of the butadiene-styrene copolymer present in the ternary composition of the present invention can range from about 0.5 to about 4 parts, by weight, per hundred parts of the aromatic polycarbonate. Preferably, the butadiene-styrene copolymer is present in amounts of from about 1 to about 3 parts, by weight, per hundred parts of the aromatic polycarbonate. The amount of the acrylate copolymer present in the ternary composition can vary from about 2 to about 6 parts, by weight, per hundred parts of the aromatic polycarbonate. Preferably, the acrylate copolymer is present in amounts of from about 3 to about 5 parts, by weight, per hundred parts of the aromatic polycarbonate.

It is also regarded to be among the features of this invention to include in the ternary polycarbonate composition conventional additives for purposes such as reinforcing, coloring or stabilizing the composition in conventional amounts.

The compositions of the invention are prepared by mechanically blending the high molecular weight aromatic polycarbonate with the butadiene-styrene copolymer and the acrylate copolymer by conventional methods.

EXAMPLES

The following examples are set forth to illustrate the invention and are not to be construed to limit the scope of the invention. In the examples and comparative study, all parts and percentages are on a weight basis unless otherwise specified.

EXAMPLE 1

Ninety-four and one-half (94.5) parts of an aromatic polycarbonate, derived from 2,2-bis(4-hydroxyphenyl)-propane and having an intrinsic viscosity (I.V.) in the range of from about 0.46 to about 0.49 dl/g as determined in methylene chloride solution at 25° C., was mixed with four (4) parts of a copolymer of n-butyl acrylate and methyl methacrylate (hereinafter acrylate copolymer), said copolymer having a weight ratio of n-butyl-acrylate to methyl methacrylate of about 3 to 2, and one and one-half (1.5) parts of a butadiene-styrene copolymer (hereinafter referred to as BDS), said copolymer having a weight ratio of styrene to butadiene of from about 2 to 1 to about 3 to 1. The ingredients were then blended together by mechanically mixing them in a laboratory tumbler and the resulting mixture was fed to an extruder which was operated at about 265° C. The resulting extrudate was comminuted into pellets. The pellets were injection molded at about 290° C. to 310° C. into test specimens of about 5" by $\frac{1}{2}$" by $\frac{1}{4}$" and 5" by $\frac{1}{2}$" by $\frac{1}{8}$", the latter dimension being the specimen thickness. Izod impact strengths of these specimens are measured according to the notched Izod test, ASTM D256, and are set forth in Table I. The ductile-brittle transition temperature (D/B), which is the highest temperature at which a sample begins to exhibit a brittle mode of failure rather than a ductile mode of failure, was obtained according to the procedures of ASTM D256 and is also listed in Table I. The sample labeled CONTROL was obtained from a polycarbonate resin having an I.V. from about 0.46 to about 0.49 dl/g and was prepared without either the acrylate copolymer or BDS.

EXAMPLE 2

The procedure of Example 1 was repeated exactly, except that the weight parts of polycarbonate, acrylate copolymer and BDS in the test specimen were, respectively, 96, 3 and 1. The results of the notched Izod impact tests and the B/D are listed in Table I.

EXAMPLE 3

The procedure of Example 1 was repeated exactly, except that the weight parts of polycarbonate, acrylate copolymer and BDS in the test specimen were, respectively, 95, 4 and 1. The results of the notched Izod impact tests are listed in Table I.

TABLE I

| Composition of: | Impact Strength, ft. lb./in. | | | | D/B, °C. |
|---|---|---|---|---|---|
| | $\frac{1}{4}$" Thick Not Aged | $\frac{1}{8}$" Thick Not Aged | $\frac{1}{8}$" Heat Aged at 125° C. | | $\frac{1}{8}$", Not Aged |
| | | | 24 hrs. | 48 hrs. | |
| Example 1 | 12.6[1] | 13.3[1] | 14.0[1] | 11.3[1] | −20/−23** |
| Example 2 | 13.4[1] | * | 13.7[1] | 13.9[1] | * |
| Example 3 | 12.8[1] | 14.7[1] | 13.3[1] | * | −20/−23** |
| CONTROL | 1.6[2] | 14.8[1] | 1.3[2] | * | > −5 |

[1]Samples failed with 100% ductility.
[2]Samples failed with 0% ductility.
*Test not made.
**Change from ductile mode of failure to brittle mode of failure noted over indicated range.

EXAMPLE 4

The procedure of Example 1 was followed exactly, and the resulting composition, which contained 94.5 weight parts polycarbonate, 4 weight parts acrylate copolymer, and 1.5 weight part BDS, was tested, using the notched Izod test, for subzero temperature impact performance of $\frac{1}{8}$" thick samples which were each maintained at −18° C. and −29° C. for 45 minutes.

The results of these tests, as expressed in ft. lb./in., are set forth in Table II. The results of these tests illustrate the excellent low temperature impact strength of the invention's ternary composition.

COMPARATIVE EXAMPLE 1

The procedure of Example 1 was followed except that BDS was not added to the mixture. The resulting composition, which contained 96 weight parts polycarbonate and 4 weight parts acrylate copolymer, was tested for subzero temperature impact performance of a $\frac{1}{8}$" thick sample at −18° C. and −29° C. The results of these tests are set forth in Table II.

II

| Composition of: | Impact Strength, ft. lb./in. $\frac{1}{8}$" Thick at | |
|---|---|---|
| | −18° C. | −29° C. |
| Example 4 | 12.4 | 4.9 |
| Comparative Example 1 | 4.0 | 2.6 |

The invention's ternary compositions also exhibited good weld-line strength as shown in double gate Izod impact tests which were conducted to procedures as specified in ASTM D256.

What is claimed is:

1. A ternary polycarbonate composition comprising in admixture a high molecular weight aromatic polycarbonate which is based on a dihydric phenol, from about 2 to about 6 parts by weight per hundred parts of said aromatic polycarbonate of an acrylate copolymer, which is a copolymer of $C_1$–$C_5$ acrylate and a $C_1$–$C_5$ methacrylate, and from about 0.5 to about 4 parts by weight per hundred parts of said aromatic polycarbonate of a butadiene-styrene copolymer.

2. The composition of claim 1 wherein the acrylate copolymer is present in an amount of from about 3 to about 5 parts by weight per hundred parts of aromatic polycarbonate.

3. The composition of claim 1 wherein the butadiene-styrene copolymer is present in an amount of from about 1 to about 3 parts by weight per hundred parts of aromatic polycarbonate.

4. The composition of claim 1 wherein in the acrylate copolymer, the methacrylate is selected from the group consisting of methyl methacrylate, 1,3-butylene dimethacrylate, isobutyl methacrylate, butyl methacrylate and ethyl methacrylate and the acrylate is selected from the group consisting of 1,4-butanediol diacrylate, isobutyl acrylate, methyl acrylate, ethyl acrylate, n-butyl acrylate and 1,3-butylene diacrylate.

5. The composition of claim 4 wherein the aromatic polycarbonate is derived from 2,2-bis(4-hydroxyphenyl)propane.

6. The composition of claim 5 wherein in the acrylate-methacrylate copolymer, the methacrylate is methyl methacrylate and the acrylate is n-butyl acrylate.

7. The composition of claim 6 wherein in the acrylate-methacrylate copolymer, the weight ratio of methyl methacrylate to n-butyl acrylate ranges from about ½ to about 2/1.

8. A ternary polycarbonate composition comprising in admixture a high molecular weight aromatic polycarbonate which is derived from 2,2-bis(4-hydroxyphenyl)propane and from about 1 to about 3 parts by weight per hundred parts of said aromatic polycarbonate, of a butadiene-styrene copolymer wherein, in said butadiene-styrene copolymer, the weight ratio of styrene to butadiene ranges from about 2 to 1 to about 3 to 1; and from about 3 to about 5 parts by weight, per hundred parts of said aromatic polycarbonate, of a copolymer of methyl methacrylate and n-butyl acrylate, wherein the weight ratio of n-butylacrylate to methyl methacrylate is about 3/2.

* * * * *